(12) United States Patent
Suto

(10) Patent No.: US 6,989,217 B2
(45) Date of Patent: Jan. 24, 2006

(54) BATTERY LOADING DEVICE FOR PORTABLE ELECTRONIC APPARATUS

(75) Inventor: Kazutoshi Suto, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 98 days.

(21) Appl. No.: 10/634,774

(22) Filed: Aug. 6, 2003

(65) Prior Publication Data

US 2004/0038088 A1 Feb. 26, 2004

(30) Foreign Application Priority Data

Aug. 21, 2002 (JP) .............................. 2002-240879

(51) Int. Cl.
*H01M 2/02* (2006.01)
*H01M 2/00* (2006.01)
*H01M 2/10* (2006.01)
*B65D 85/88* (2006.01)

(52) U.S. Cl. ............... 429/178; 429/163; 429/177; 429/96; 429/99; 220/500; 220/503; 220/523

(58) Field of Classification Search ............ 429/96, 429/99, 9, 163, 178, 177; 200/500, 503, 200/504, 523, 524
See application file for complete search history.

(56) References Cited

U.S. PATENT DOCUMENTS 6,421,233 B1 * 7/2002 Hong .................... 361/683
6,459,176 B1 * 10/2002 Brockel et al. ............ 307/150

FOREIGN PATENT DOCUMENTS

| JP | 5-054623 A | 3/1993 |
| JP | 7-41969 U | 7/1995 |
| JP | 8-162080 A | 6/1996 |
| JP | 2000-277077 A | 10/2000 |

OTHER PUBLICATIONS

Eastman-Kodak. Kodak Easyshare DX3215 Zoom Digital Camera User's Guide. Eastman Kodak Co. 2001. pp. 3, 47, 68, 70.*
Linden, David, et al. Handbook of Batteries. Third Edition. McGraw-Hill. 2002. pp. 22.12, 22.13.*

* cited by examiner

*Primary Examiner*—Patrick Joseph Ryan
*Assistant Examiner*—Melissa Austin
(74) *Attorney, Agent, or Firm*—Sughrue Mion, PLLC

(57) ABSTRACT

A battery chamber, in which a dry cell or a battery pack is selectively loaded, is provided in a corner of a digital camera. The battery pack is inserted through a loading gate of a side surface of the digital camera, and plural dry cells are inserted through a loading gate in a bottom surface thereof. Four holes are formed in the loading gate in the bottom surface, and the dry cells are inserted in the respective holes. The loading gate in the side surface has a large size according to a shape of the battery pack. In the battery chamber, contact segments for dry cells and contact segments for battery pack are respectively provided.

7 Claims, 5 Drawing Sheets

BATTERY LOADING DEVICE FOR PORTABLE ELECTRONIC APPARATUS

BACKGROUND OF THE INVENTION

1. Field of the Invention

The present invention relates to a battery loading device for a portable electronic apparatus and, more specifically, to a battery loading device in which two kinds of batteries can be selectively loaded.

2. Description of the Prior Arts

A battery is used as a power source for a portable electronic apparatus, such as a digital camera and personal digital assistants (PDA). For this type of battery, there are a primary battery as represented by a dry cell and a secondary battery as represented by a lithium ion battery. The secondary battery, which has a large capacity and can be used repeatedly through charging, is ordinarily used. The easily available primary battery is used in emergency, such as a time when the secondary battery is completely consumed.

A battery loading device in which two kinds of batteries are selectively loaded is disclosed in Japanese Utility-Model Laid-Open Publication No. 7-41969, Japanese Patent Laid-Open Publication Nos. 2000-277077, 8-162080, and 5-54623, and so forth. With respect to the battery loading devices described in these publications, a part of a battery chamber is used in common by the two kinds of batteries. Thereby, two independent battery chambers are not required, so that the space thereof can be reduced. In addition, it is advantageous in terms of saving an exclusive adaptor for the primary battery.

However, many of the battery loading devices described in the aforementioned publications require a user to move a movable plate in the battery chamber, or to move or change a terminal board. Thereby, a user is required to perform the complicated operation, leading to erroneous operation.

As the primary battery, AA dry cells are often used. The dry cells are arranged horizontally in the battery chamber. Since the secondary battery, which is larger than the dry cell, is also loaded in the battery chamber, it is necessary to enlarge an opening of the battery loading device. Accordingly, a larger lid for opening and closing the opening is required. In addition, the user cannot understand immediately how and where to load the dry cells or the secondary battery when the lid is open.

SUMMARY OF THE INVENTION

A primary object of the present invention is to provide a battery loading device for a portable electronic apparatus in which two kinds of batteries can be selectively loaded in a simple manner.

Another object of the present invention is to provide a battery loading device for a portable electronic apparatus in which the two kinds of batteries can be loaded accurately.

A further object of the present invention is to provide a battery loading device for an electronic apparatus in which a space of a battery chamber can be reduced.

The above and other objects are achieved by providing a battery chamber in which a first type battery or a second type battery is selectively loaded, a first loading gate through which the first type battery is loaded in the battery chamber, and a second loading gate through which the second type battery is loaded in the battery chamber. The first and the second loading gate are respectively formed in a first and a second exterior surface of the electronic apparatus. The first and the second exterior surface are provided adjacent to each other interposing a corner of the electronic apparatus, and they are perpendicular to each other. The first and the second loading gate are respectively opened by a first and a second lid. A first and a second chamber wall of the battery chamber are respectively faced to the first and the second loading gate. A first contact segment, which is contacted with electrodes of the first type battery, is provided in the first chamber wall, whereas a second contact segment, which is contacted with electrodes of the second type battery, is provided in the second chamber wall.

A cylindrical dry cell is available as the first type battery, and a secondary battery having a rectangular parallelepiped shape or a plate-like shape is available as the second type battery. The secondary battery capable of charging and discharging is ordinarily used. When the power of the secondary battery has been completely consumed, the plural dry cells are used instead of the secondary battery. The dry cells are loaded through the first loading gate, whereas the secondary battery is loaded through the second loading gate.

According to the present invention, two kinds of batteries which have different shape and size can be loaded through different loading gates, so that the two kinds of batteries can be loaded without a mistake. In addition, it is not necessary to change a contact segment, so that each battery can be loaded easily. Furthermore, since the two kinds of batteries are selectively loaded, the space of the battery chamber can be reduced.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE PREFERRED EMBODIMENTS

Figure 1:
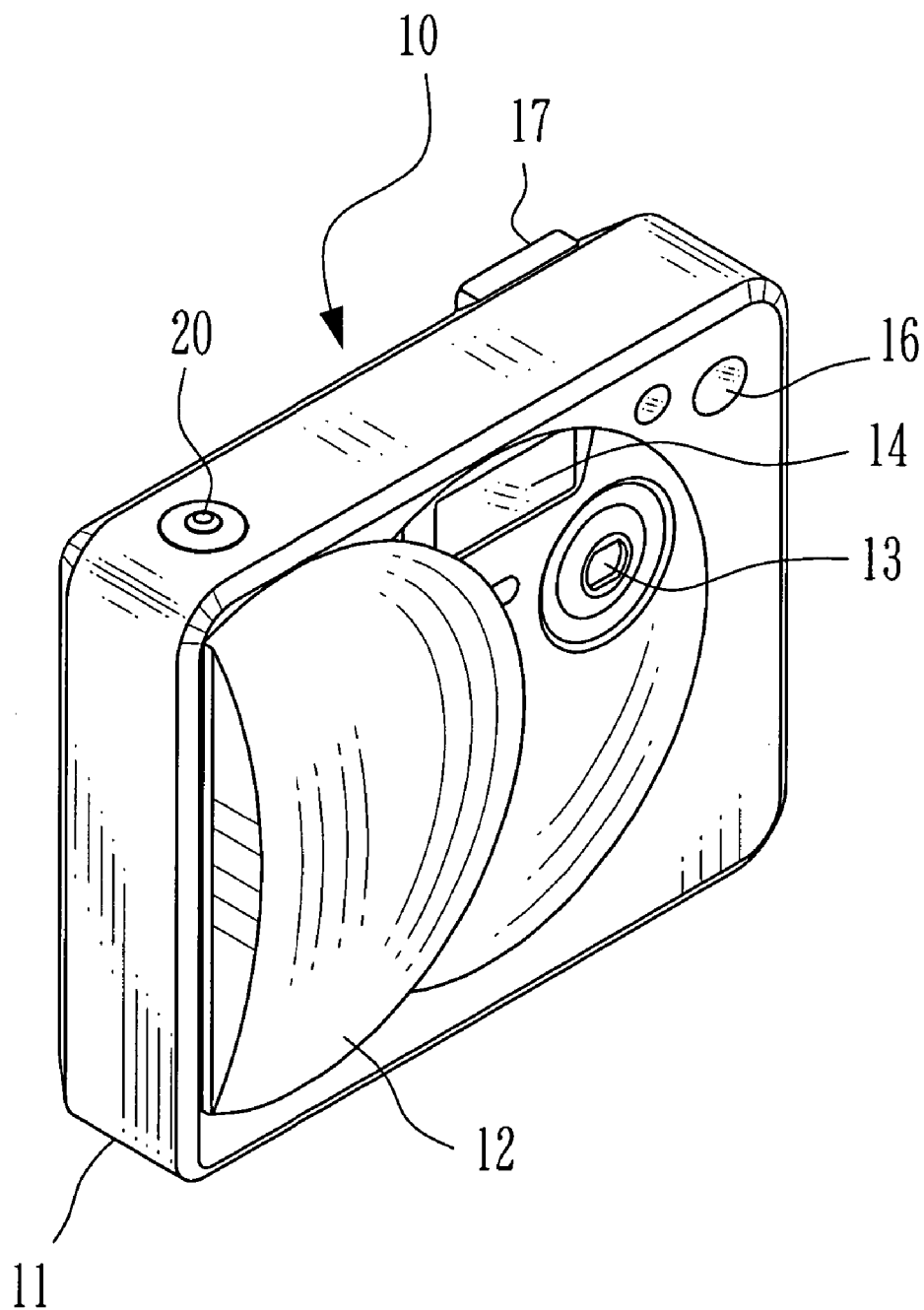
FIG. 1 is a front perspective view of a digital camera to which the present invention is applied.
Figure 2:
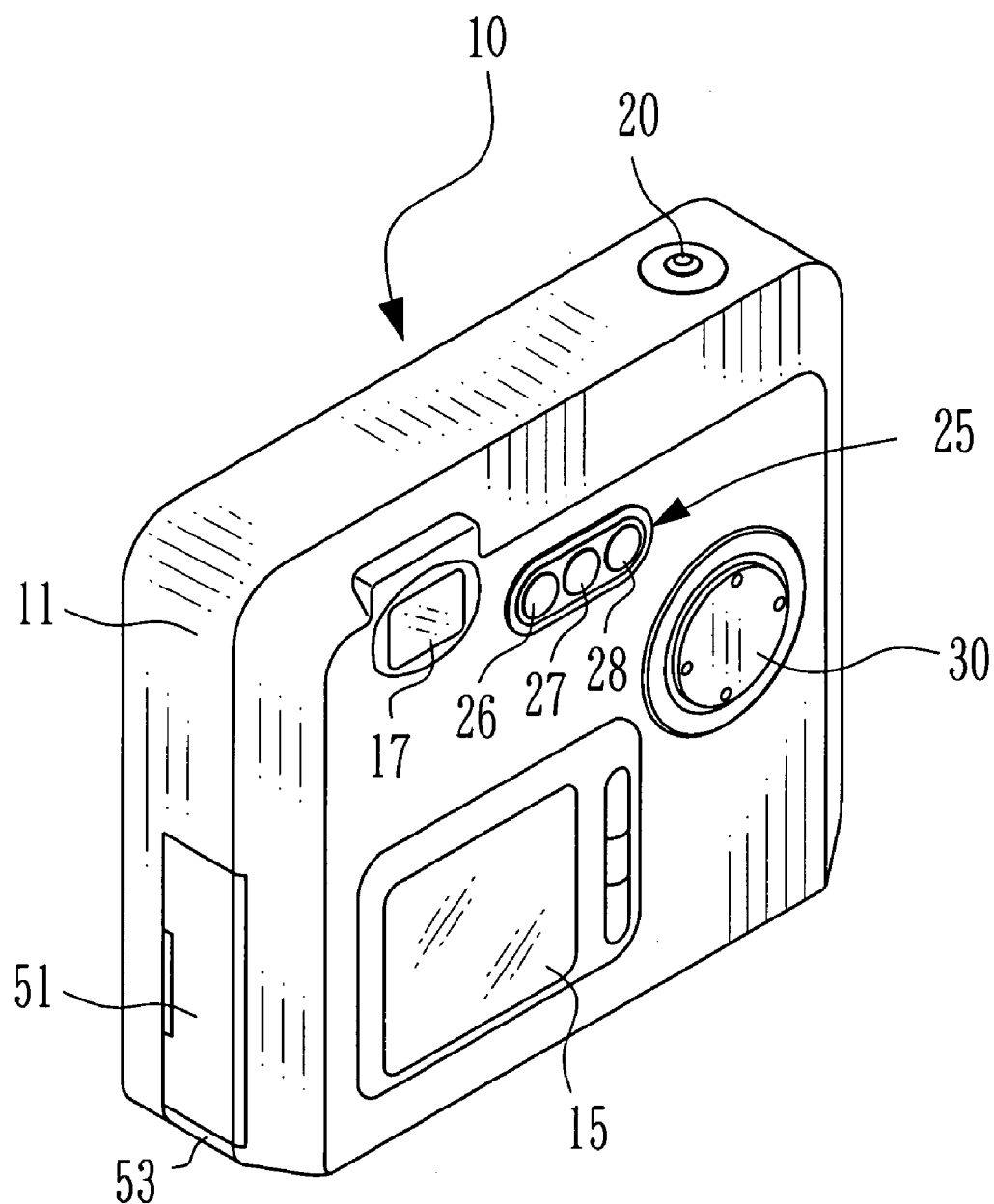
FIG. 2 is a rear perspective view of the digital camera shown in FIG. 1.

In FIGS. 1 and 2, a camera body 11 has a thin box shape, and a substantially half moon-shaped lens barrier 12 is provided to be slidable freely in the front of the camera body 11. When the lens barrier 12 is slid to an open position shown in FIG. 1, a taking lens 13 and a flash emitter 14 are exposed. As is generally known a CCD image sensor is disposed behind the taking lens 13, and outputs an electronic signal after an optical subject image formed through the taking lens 13 has been converted photoelectrically.

The electronic signal outputted from the CCD image sensor is converted to image data by an A/D converter, and then receives various signal processings in an image processing circuit. Image data is temporarily stored in a built-in memory. After being stored, image data is read out, and sent to a liquid crystal display 15 to display the subject image thereon as a through-image. Since the liquid crystal display 15 has a large power consumption, an optical finder may be used instead of the liquid crystal display 15. The optical finder is provided with a finder objective window 16 and a finder eyepiece window 17. If a release button 20 is pushed down after the framing has been performed, image data of one frame outputted from the CCD image sensor is stored in a removable external memory. As the external memory, a PC card, an IC memory, a mini floppy disk, and the like are available.

As shown specifically in FIG. 2, on the rear of the camera body 11, an operation button part 25 for performing various operations and a disk-shaped cursor operation button 30 are provided as well as the liquid crystal display 15. Three buttons 26–28 are disposed in the operation button part 25. Whenever a power button 26 is depressed, the power switch is turned on-off. A zooming operation button 27 is used to make the taking lens 13 zoom to a wide side or a telephoto side. A mode selecting button 28 is used to change the mode of the digital camera to a photographing mode, a reproduction mode, or a menu displaying mode.

The cursor operation button 30 is used to move a cursor for selecting one of the plural menus displayed on the liquid crystal display 15 during the menu displaying mode. The cursor button 30 can be depressed in four directions of up and down, left and right to move the cursor in the corresponding direction.

Figure 3:
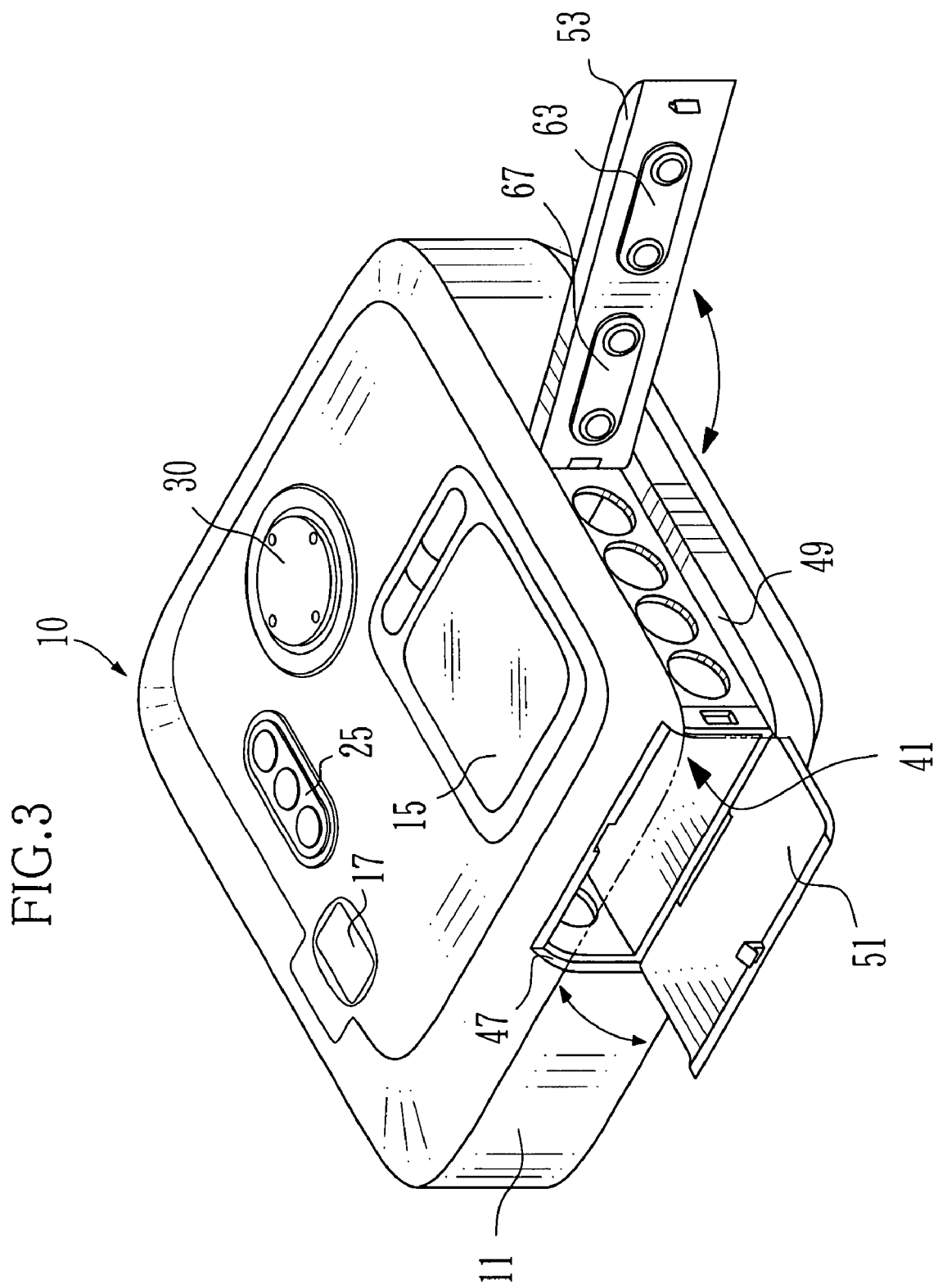
FIG. 3 is a rear perspective view of the digital camera, wherein two battery lids are open.

As shown in FIG. 3, a battery chamber 41 in which two kinds of batteries can be selectively loaded is provided in the corner of the digital camera 10. In this embodiment, as the two kinds of batteries, an easily available primary battery and a chargeable secondary battery are applied. An example of the primary battery is an AA dry cell 43. Meanwhile, as the secondary battery, a battery pack 45 is used. The battery pack 45 has packaged plural lithium ion batteries that are electrically connected in series or in parallel.

The dry cell 43 and the battery pack 45 are respectively inserted and taken out through loading gates 47 and 49. The loading gate 47 is provided in the lateral side of the camera 11 and covered by an openable lid 51, while the loading gate 49 is provided in the bottom side of the camera body 11 and covered by an openable lid 53. The battery chamber 41 is used by both the dry cell 43 and the battery pack 45, so that the space of the battery chamber can be reduced as compared with the case where two battery chambers are provided. Thus, the battery chamber 41 is useful for the miniaturization of the electronic apparatus.

Figure 4:
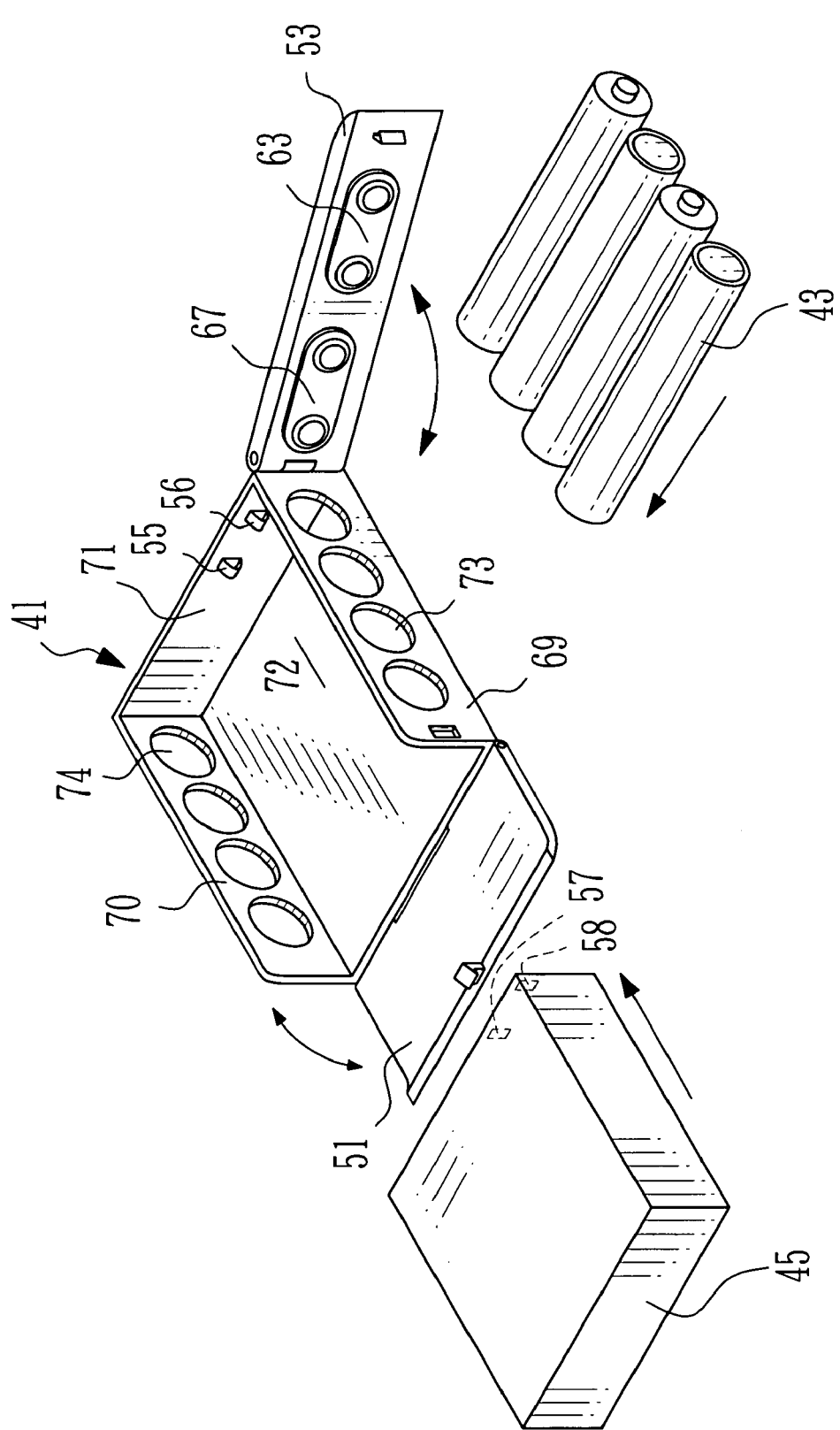
FIG. 4 is a perspective view showing a relevant part of the present invention.
Figure 5:
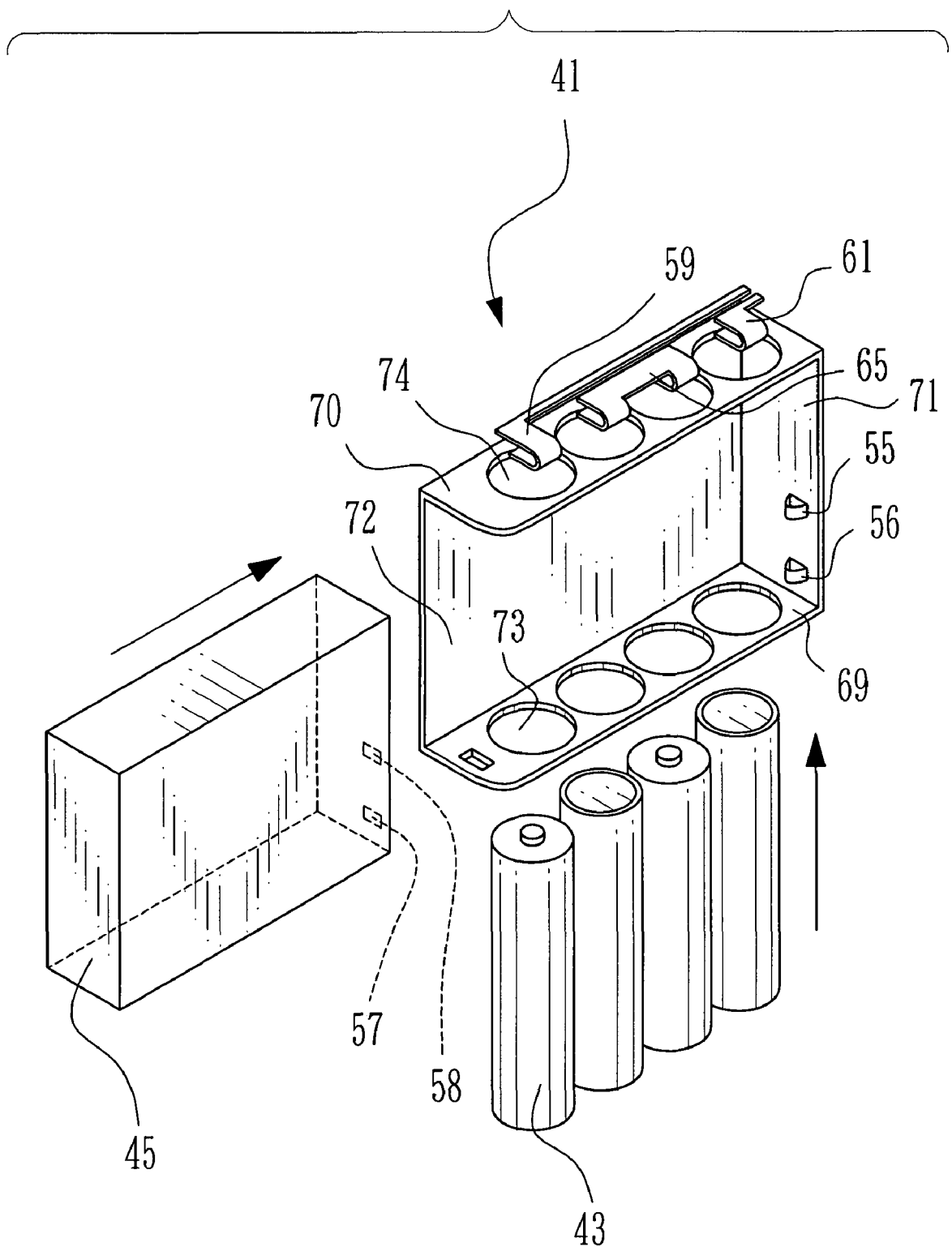
FIG. 5 is a perspective view similar to FIG. 4, in which a battery chamber is in a vertical state.

As shown in FIGS. 4 and 5, the battery chamber 41 is formed by a bottom wall 69, an upper wall 70, a lateral wall 71, a front wall 72, and a rear wall (not shown). The bottom wall 69 is provided adjacent to the loading gate 49, and the upper wall 70 and the bottom wall 69 are faced to each other. The lateral wall 71 is provided in opposition to the loading gate 47, and the lateral wall 71 is approximately perpendicular to the bottom wall 69 and the upper wall 70.

Four circular holes 73 and 74 are respectively formed in the bottom wall 69 and the upper wall 70. Both ends of the plural dry cells 43 are fitted in the holes 73 and 74, and the result is that the dry cells 43 are held in the battery chamber 41. Meanwhile, the battery pack 45 is held by the bottom wall 69, the upper wall 70, the side wall 71, the front wall 72, and the rear wall.

A positive contact segment 55 and a negative contact segment 56 for the battery pack 45 are provided in the lateral wall 71. When the lid 51 is closed after the battery pack 45 has been loaded in the battery chamber 41, the battery pack 45 is pushed by the lid 51, and a plus terminal 57 and a minus terminal 58 are respectively pressed into contact with the positive and the negative contact segments 55 and 56. The power of the battery pack 45 is supplied to the digital camera 10 through the positive and the negative contact segments 55 and 56.

A positive contact segment 59, a negative contact segment 61, and a connecting segment 65 are provided in the battery chamber 41 so as to face the four holes 74. Two connecting segments 63 and 67 for connecting neighboring battery cells 43 to each other in series are attached to the interior of the lid 53. When the four dry cells 43 are loaded in the battery chamber 41, they are arranged with their polarities alternately reversed. If the lid 53 is closed, the four dry cells 43 are pushed by the lid 53, and electrically connected in series. Thereafter, the power of the dry cells 43 is supplied to the digital camera 10 through the positive and the negative contact segments 59 and 61.

Next, the operation of the present invention is explained. The battery pack 45 is normally loaded in the digital camera 10. In loading the battery pack 45, the lid 51 is opened first, and then the battery pack 45 is inserted in the battery chamber 41 through the loading gate 47. After the lid 51 has been closed, the battery pack 45 is held in the battery chamber 41. The plus and the minus terminals 57 and 58 of the battery pack 45 are respectively pressed into contact with the positive and the negative contact segments 55 and 56 provided in the battery chamber 41. Thereby, the power of the battery pack 45 is supplied to the digital camera 10.

When the user attempts to load the battery pack 45 through the loading gate 49, the bottom wall 69 prevents the loading of the battery pack 45. On the other hand, the lid 51 is open to expose the loading gate 47 which is shaped to fit the shape of the battery pack 45, so that the user can understand that the battery pack 45 should be loaded through the loading gate 47. Due to the difference in shape between the loading gate 47 and the loading gate 49, the user can load the battery pack 45 without a mistake.

In case the energy in the battery pack 45 is used up upon using the digital camera 10, the dry cells 43 are used as an emergency power supply. First, after the lid 51 has been opened, the battery pack 45 is removed from the battery chamber 41. Next, the lid 51 is closed, and then the lid 53 is opened. Thereafter, the four dry cells 43 are loaded in the battery chamber 41 through the loading gate 49. At that time, the first dry cell 43 is inserted through the hole 73 so as to correspond the positive contact segment 59 in the battery chamber 41 to the plus electrode of the dry cell 43. The opposite ends of the dry cell 43 are fitted in the holes 73 and 74, and held by the bottom wall 69 and the upper wall 70. The second and subsequent dry cells 43 are respectively inserted through the holes 73 with the adjacent polarities alternately reversed. When the loading of the four dry cells 43 is completed, the lid 53 is closed. Thereby, the four dry cells 43 are connected in series by the positive contact segment 59 and connecting segments 63, 65, and 67, and then the electric power is supplied to the digital camera 10.

Even if the user has loaded the dry cells 43 through the loading gate 47, since the height of the battery chamber 41 is much larger than the diameter of the dry cell 43, the dry cells 43 are not fitted into the battery chamber 41. Thus, the user can easily notice the mistake of loading. Meanwhile, if the lid 53 is open, the four circular holes 73 are exposed, so that the user can also notice that the dry cells 43 should be loaded through the loading gate 49.

As aforementioned, the loading gates 47 and 49 are respectively provided for the two kinds of batteries, so as to prevent the batteries from being wrongly loaded. Moreover, when the battery pack 45 or the dry cell 43 is used, it is not necessary to move or change a terminal plate. In addition, a battery holder for two kinds of batteries with different sizes is not required. The dry cell 43 is readily available at a nearby store, so that photographing can be continued even if the power shortage of the battery pack 45 occurs.

The negative contact segments 61 and 56 are connected to a power circuit of the electronic apparatus through a common lead wire. On the other hand, in order to prevent the dry cell 43 from being charged, the positive contact segments 59 and 55 are respectively connected to the power circuit of the electronic apparatus through independent lead wires. In case of a mobile phone and the like, a terminal for charging is provided in an exterior of the electronic apparatus, so that it is possible to charge the battery pack loaded in the battery chamber. Such electronic apparatus may be operated to charge the dry cell in a state as the dry cell is loaded in the battery chamber. The wirings of the primary battery and the secondary battery are independently provided, so that such mischarging can be prevented. If two independent lead wires for each negative contact segment are provided, a common lead wire can be used for each positive contact segment.

In the above embodiment, although the four dry cells are used, more or less than four dry cells may be also used. The four dry cells are arranged in a line; however, they may be arranged two by two in two lines. Additionally, the plural dry cells may be electrically connected in parallel to each other. Note that another type of battery may be used as the primary battery and the second battery instead of the AA dry cells and the battery pack.

Moreover, in FIG. 4, although the secondary battery is inserted horizontally in the battery chamber 41, it may be inserted vertically therein. In addition, the loading gates 47 and 49 are respectively provided in the lateral and the bottom of the electronic apparatus; however, the places thereof may be exchanged with each other.

Furthermore, although the digital camera is explained as the example of the electronic apparatus, the present invention is also applicable for use in a video camera, a CD player, a PDA, a portable phone, and so forth.

It is to be understood that the above-described embodiments are simply of the invention. Other embodiments may be devised by those skilled in the art which will embody the principle of the invention and fall within the spirit and scope thereof.

What is claimed is:

1. A battery loading device for a portable electronic apparatus, comprising;
    a common battery chamber in which a first type battery or a second type battery is selectively loaded;
    a first loading gate through which said first type battery is loaded in said common battery chamber, said first loading gate being provided in a first exterior surface of said electronic apparatus so as to face a first chamber wall of said common battery chamber;
    a first lid for opening and closing said first loading gate;
    a second loading gate through which said second type battery is loaded in said common battery chamber, said second loading gate being provided in a second exterior surface of said electronic apparatus so as to face a second chamber wall of said common battery chamber, said second exterior surface being approximately perpendicular to said first exterior surface;
    a second lid for opening and closing said second loading gate;
    a first contact segment being provided in said first chamber wall, said first contact segment being contacted with an electrode of said first type battery; and
    a second contact segment being provided in said second chamber wall, said second contact segment being contacted with an electrode of said second type battery;
    wherein said first type battery is a primary battery and said second type battery is a secondary battery.

2. The battery loading device as claimed in claim 1, wherein said common battery chamber is provided in a corner of said electronic apparatus.

3. The battery loading device as claimed in claim 2, wherein said first type battery is a cylindrical dry cell.

4. The battery loading device as claimed in claim 3, wherein a plurality of circular first holes are formed in said first loading gate, and a corresponding said dry cell is inserted in said common battery chamber in an axial direction through each of said first holes.

5. The battery loading device as claimed in claim 4, further comprising a third contact segment which is attached to said first lid, said third contact segment and said first contact segment connecting said dry cells in series, and said dry cells being inserted in said common battery chamber so as to be arranged in a row.

6. The battery loading device as claimed in claim 5, wherein circular second holes are arranged in a row in said first chamber wall, one end of each said dry cells being inserted in each of said second holes, and said second contact segment being arranged in back of said second holes.

7. The battery loading device as claimed in claim 5, wherein said secondary battery has a perpendicular shape or a plate-like shape.

* * * * *